US012613326B2

(12) United States Patent
Vojnika et al.

(10) Patent No.: US 12,613,326 B2
(45) Date of Patent: Apr. 28, 2026

(54) MACHINE LEARNED USER INTERFACE FOR DYNAMIC CONTROL OF INTELLIGENT RADAR CLUTTER MITIGATION

(71) Applicant: Lockheed Martin Corporation, Bethesda, MD (US)

(72) Inventors: Mirjeta Vojnika, Maple Shade, NJ (US); Mauro Joseph Sanchirico, III, Marlton, NJ (US); Sean O'Rourke, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 559 days.

(21) Appl. No.: 18/147,949

(22) Filed: Dec. 29, 2022

(65) Prior Publication Data

US 2024/0219555 A1     Jul. 4, 2024

(51) Int. Cl.
| | |
|---|---|
| *G01S 13/52* | (2006.01) |
| *G01S 13/524* | (2006.01) |
| *G01S 13/56* | (2006.01) |

(52) U.S. Cl.
CPC .......... *G01S 13/5244* (2013.01); *G01S 13/56* (2013.01)

(58) Field of Classification Search
CPC ............................. G01S 13/5244; G01S 13/56
See application file for complete search history.

(56) References Cited

U.S. PATENT DOCUMENTS

| | | | |
|---|---|---|---|
| 2,532,546 | A | 12/1950 | Forbes |
| 2,994,080 | A | 7/1961 | Varela |
| | (Continued) | | |

FOREIGN PATENT DOCUMENTS

| | | |
|---|---|---|
| CN | 107167781 A | 9/2017 |
| EP | 2835795 B1 | 6/2016 |
| | (Continued) | |

OTHER PUBLICATIONS

Ilyushin "CLUSIM: A Synthetic Aperture Radar Clutter Simulator for Planetary Exploration", Radio Science, 52, 1200-1213 , Sep. 29, 2017 (Year: 2017).*

*Primary Examiner* — Robert W Hodge
*Assistant Examiner* — Helena H Seraydaryan
(74) *Attorney, Agent, or Firm* — Michael Best & Friedrich LLP

(57) ABSTRACT

Systems and methods for sensing targets within an ambient environment. One example system includes a human machine interface and an electronic processor. The electronic processor is configured to receive sensor data including a plurality of targets. The electronic processor is configured to select a clutter mitigation model and generate, with the clutter mitigation model, a subset of the plurality of targets based on the sensor data. The electronic processor is configured to receive, from the human machine interface, an operator sensitivity setting. The electronic processor is configured to generate, with a machine learning mapping function, a post-processing parameter based on the operator sensitivity setting. The electronic processor is configured to process the subset of the plurality of targets based on the post-processing parameter to select, from the subset, a display target. The electronic processor is configured to display, via the human machine interface, the display target.

18 Claims, 9 Drawing Sheets

(56) References Cited

U.S. PATENT DOCUMENTS

| 3,392,387 | A | 7/1968 | Kirkpatrick |
|---|---|---|---|
| 3,781,878 | A | 12/1973 | Kirkpatrick |
| 7,548,187 | B1 | 6/2009 | Laste et al. |
| 8,259,003 | B2 | 9/2012 | Song |
| 9,081,853 | B2 | 7/2015 | Rao et al. |
| 9,213,089 | B2 | 12/2015 | Mowbray et al. |
| 9,239,951 | B2 | 1/2016 | Hoffberg et al. |
| 10,032,464 | B2 | 7/2018 | Franklin et al. |
| 10,052,073 | B2 | 8/2018 | Davis et al. |
| 10,402,039 | B2 | 9/2019 | Curtis et al. |
| 10,481,751 | B2 | 11/2019 | Sharon et al. |
| 10,770,035 | B2 | 9/2020 | Giusti et al. |
| 10,866,978 | B2 | 12/2020 | Raison et al. |
| 2016/0282457 | A1 | 9/2016 | Mazzaro et al. |
| 2017/0082732 | A1 | 3/2017 | Oswald et al. |
| 2017/0192088 | A1 * | 7/2017 | Fluhler ................. G01S 7/2922 |
| 2020/0285383 | A1 | 9/2020 | Giusti et al. |

FOREIGN PATENT DOCUMENTS

| EP | 3173812 | A1 | 5/2017 |
|---|---|---|---|
| WO | 2017175190 | A1 | 10/2017 |
| WO | 2018005070 | A1 | 1/2018 |
| WO | 2018138725 | A1 | 8/2018 |

* cited by examiner

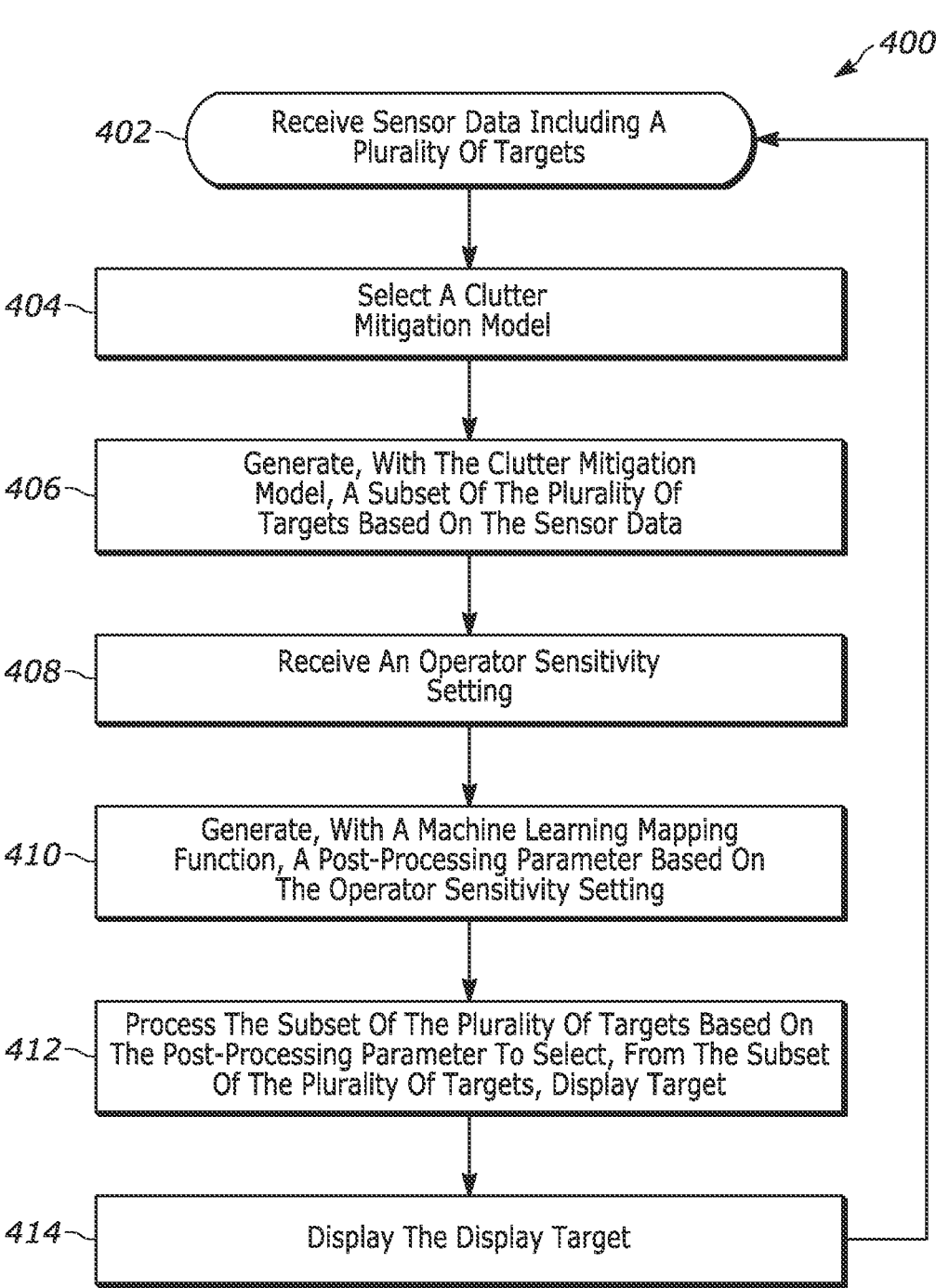

400

402 — Receive Sensor Data Including A Plurality Of Targets

404 — Select A Clutter Mitigation Model

406 — Generate, With The Clutter Mitigation Model, A Subset Of The Plurality Of Targets Based On The Sensor Data 408 — Receive An Operator Sensitivity Setting 410 — Generate, With A Machine Learning Mapping Function, A Post-Processing Parameter Based On The Operator Sensitivity Setting 412 — Process The Subset Of The Plurality Of Targets Based On The Post-Processing Parameter To Select, From The Subset Of The Plurality Of Targets, Display Target 414 — Display The Display Target

FIG. 4

MACHINE LEARNED USER INTERFACE FOR DYNAMIC CONTROL OF INTELLIGENT RADAR CLUTTER MITIGATION

FIELD OF INVENTION

This disclosure relates to detecting and classifying targets using radar, and more particularly, to differentiating between clutter and true targets.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments, examples, aspects, and features of concepts that include the claimed subject matter and explain various principles and advantages of those embodiments, examples, aspects, and features.

FIG. 4 is a flowchart illustrating a method for dynamic control of intelligent radar clutter mitigation in accordance with some examples.

Figure 1:
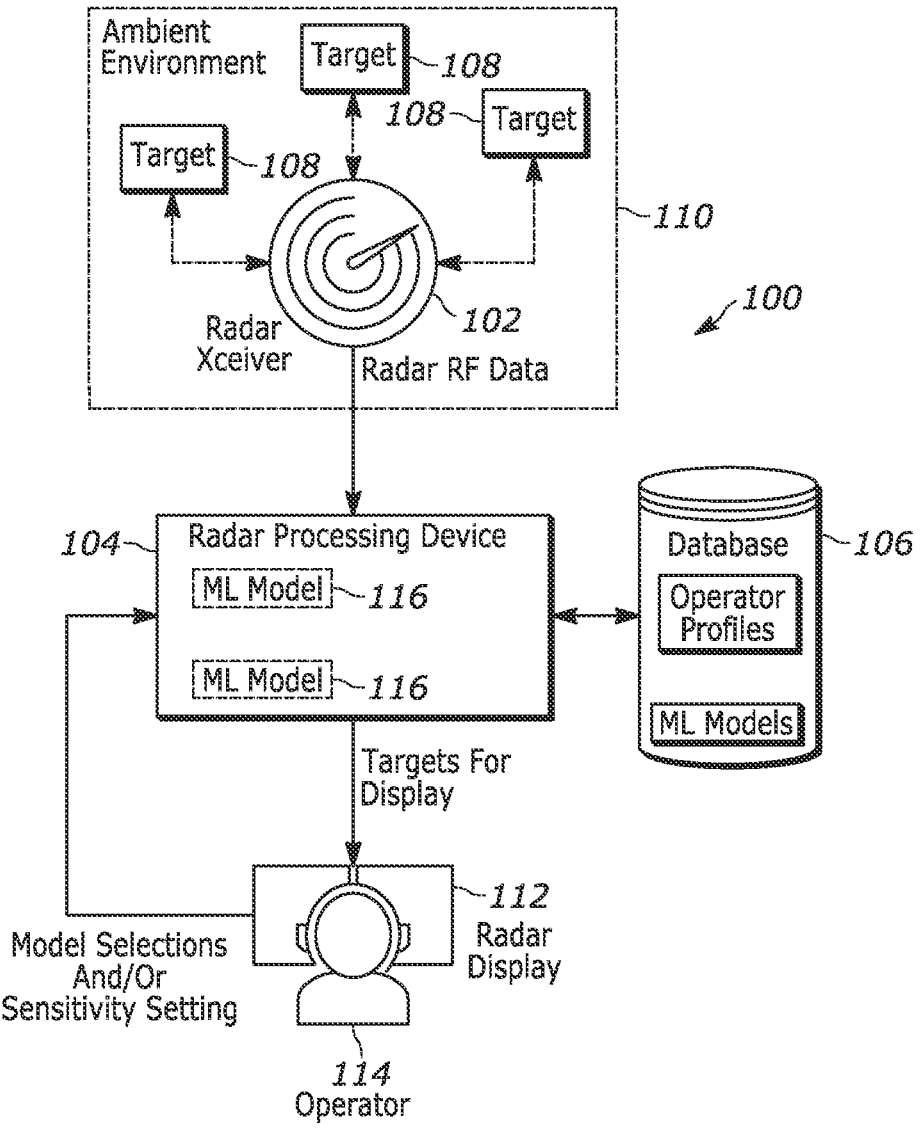
FIG. 1 illustrates a sensor system in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of examples, aspects, and features illustrated.

In some instances, the apparatus and method components have been represented where appropriate by conventional symbols in the drawings, showing only those specific details that are pertinent to understanding the of various embodiments, examples, aspects, and features so as not to obscure the disclosure with details that will be readily apparent to those of ordinary skill in the art having the benefit of the description herein.

DETAILED DESCRIPTION OF THE INVENTION

Radar systems transmit and receive high-frequency radio waves to detect and track moving objects (e.g., ballistic missiles, aircraft, and the like). In some cases, radar systems (and other sensor systems) may be overwhelmed with false alarms and may therefore be unable to differentiate between environmental clutter and true targets. This problem is exacerbated when mission requirements demand tracking targets, which are low and slow flying, small, or otherwise possess kinematic, visual, or other characteristics which blend in with the ambient environment. Such targets demand higher receiver sensitivity, which exposes the sensor system to more false alarms and consequently increases frame time and search time. Higher receiver sensitivity also burdens operators with multiple false alarms, making it difficult to spot and act on true targets in a timely manner.

To address these problems, some systems may use machine learning classification components to distinguish between true targets and clutter. However, in many cases, the optimal behavior of machine learned clutter mitigation models is a matter of operator preference and unique mission requirements. This may especially hold where the clutter mitigation models are employed in high volume clutter environments to perform automatic reporting of candidate targets for further action by another human operator, with his or her own unique preferences. However, setting appropriate values for the machine learned clutter mitigation models is a machine learning design problem, which is often solved manually through tedious tuning, collection of operator feedback, and retuning by engineers. This manual design and feedback collection process prevents sensor systems from being developed and delivered to end users in a timely manner. A need exists for radar systems, which can be updated continuously via operator feedback, which may be used to retrain machine learning models to respond to dynamic environments without requiring costly and time-consuming redesign by expert engineers.

To address, among other things, these technical problems with existing radar systems, including the technical problem of adapting machine learned clutter mitigation models to accommodate operator preference and unique mission requirements, systems and methods are provided herein for a machine learned user interface for dynamic control of intelligent radar clutter mitigation. Using the example systems and methods described herein, radar operators are able to adjust the sensitivity of a radar system to reduce false alarm rates.

In some instances, the system learns the operator's preferences in a "training mode," such that the sensitivity of the models themselves and dynamic weights/settings for different machine learned clutter mitigation models trained in different clutter environments can be adjusted to suit a variety of mission requirements. In some aspects, a mapping function maps an operator's sensitivity setting to the consistency counters and confidence thresholds associated with each machine learned clutter mitigation model.

In some aspects, the system provides the operator the ability to provide feedback about which tracks were desired for automatic reporting versus which were not and employs machine learning using these labels to adjust how the output of the machine learning models themselves is interpreted and displayed for the operator. For example, during a mission in an environment prone to high winds and high-volume in-air debris, the operator might provide feedback through a user interface that too many clutter tracks are being displayed. The system would then learn that, in this global region, the operator requires a lower sensitivity setting to avoid a cluttered display.

Operator sensitivity settings, as disclosed herein, are distinct from controlling the sensitivity of a sensor's detection processing, which is not the subject matter of this disclosure. Embodiments and aspects presented herein provide operator-based adaptive control over the sensitivity of the machine learned models employed in radar and other sensor systems. Using such embodiments, radar operators can control sensitivity based on environmental conditions and mission requirements. For example, a mountainous region may require different machine learning model settings than a region where sea spike clutter is of greater concern, because different natural clutter environments will have different clutter characteristics. At the same time, a different operator in the same region might prefer a different sensitivity setting and differing degrees to which that sensitivity setting responds to their feedback and adjustments in real time.

Embodiments and aspects described herein, by providing operator-based adjustment of the sensitivity of machine learned models, improve clutter mitigation in radar systems. This improvement, in turn, leads to more efficient use of the radar systems and their respective computing resources, among other benefits.

One example provides a sensor system configured to sense targets within an ambient environment. The system includes a human machine interface and an electronic processor coupled to the human machine interface. The electronic processor is configured to receive sensor data including a plurality of targets. The electronic processor is configured to select a clutter mitigation model. The electronic processor is configured to generate, with the clutter mitigation model, a subset of the plurality of targets based on the sensor data. The electronic processor is configured to receive, from the human machine interface, an operator sensitivity setting. The electronic processor is configured to generate, with a machine learning mapping function, a post-processing parameter based on the operator sensitivity setting. The electronic processor is configured to process the subset of the plurality of targets based on the post-processing parameter to select, from the subset of the plurality of targets, a display target. The electronic processor is configured to display, via the human machine interface, the display target.

Another example provides a method for operating a sensor system configured to sense targets within an ambient environment. The method includes receiving sensor data including a plurality of targets. The method includes selecting a clutter mitigation model. The method includes generating, with the clutter mitigation model, a subset of the plurality of targets based on the sensor data. The method includes receiving an operator sensitivity setting. The method includes generating, with a machine learning mapping function, a post-processing parameter based on the operator sensitivity setting. The method includes processing the subset of the plurality of targets based on the post-processing parameter to select, from the subset of the plurality of targets, a display target. The method includes displaying the display target.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

It should be understood that although certain figures presented herein illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

FIG. 1 illustrates an example sensor system 100 for sensing targets within an ambient environment. In the example shown and described herein, the system 100 is a radar system. However, the systems and methods described herein are applicable to other types of sensor systems besides radar. For example, in other instances, the sensor system 100 may be a different type of radiofrequency sensor system or a sensor system configured to sense targets using another suitable means (e.g., video streams, light detection and ranging (LIDAR), sonar, and the like).

As illustrated in FIG. 1, the system 100 includes a radar transceiver 102, a radar processing device 104, and a database 106. It should be understood that the system 100 is provided as one example and, in some instances, the system 100 may include fewer or additional components. As would be understood by one skilled in the art, FIG. 1 is a simplified diagram. Networks are more complex than the schematic elements depicted in FIG. 1.

The radar transceiver 102, the radar processing device 104, database 106, and the other illustrated components of FIG. 1 are communicatively coupled to one another via one or more wireless connections, wired connections, communications networks, or combinations of the foregoing. A suitable communications network may be implemented using various local and wide area networks, for example, a Bluetooth™ network, a Wi-Fi™ network, the Internet, a land mobile radio network, a cellular data network (for example, a Long Term Evolution (LTE) network, a 5G network, and the like) or combinations or derivatives thereof.

The radar transceiver 102 includes transmitting and receiving components and software for sending and receiving radiofrequency signals to detect targets 108 that are present within the ambient environment 110. The targets may be, for example, ballistic missiles, aircraft, unmanned aerial vehicles, and the like. The ambient environment 110 is the real-world area in which the radar transceiver is able to detect targets using radiofrequency signals. Ambient environments may be classified based on their characteristics, which may affect how signals are received by the radar transceiver 102. One example of a characteristic is geography, for example, mountainous terrain, dessert terrain, forested terrain, urban terrain, and the like. Another example is surface type, for example, water, land, a mix of surface types, or none (e.g., radar operating fan enough above the earth's surface that it does not affect the signals). Another example of a characteristic is the current weather conditions in the ambient environment, for example, rain, snow, wind, clear, and the like.

As illustrated in FIG. 1, the radar transceiver 102 sends radar data, including detected targets (sometimes referred to as traces) to radar processing device 104.

Figure 2:
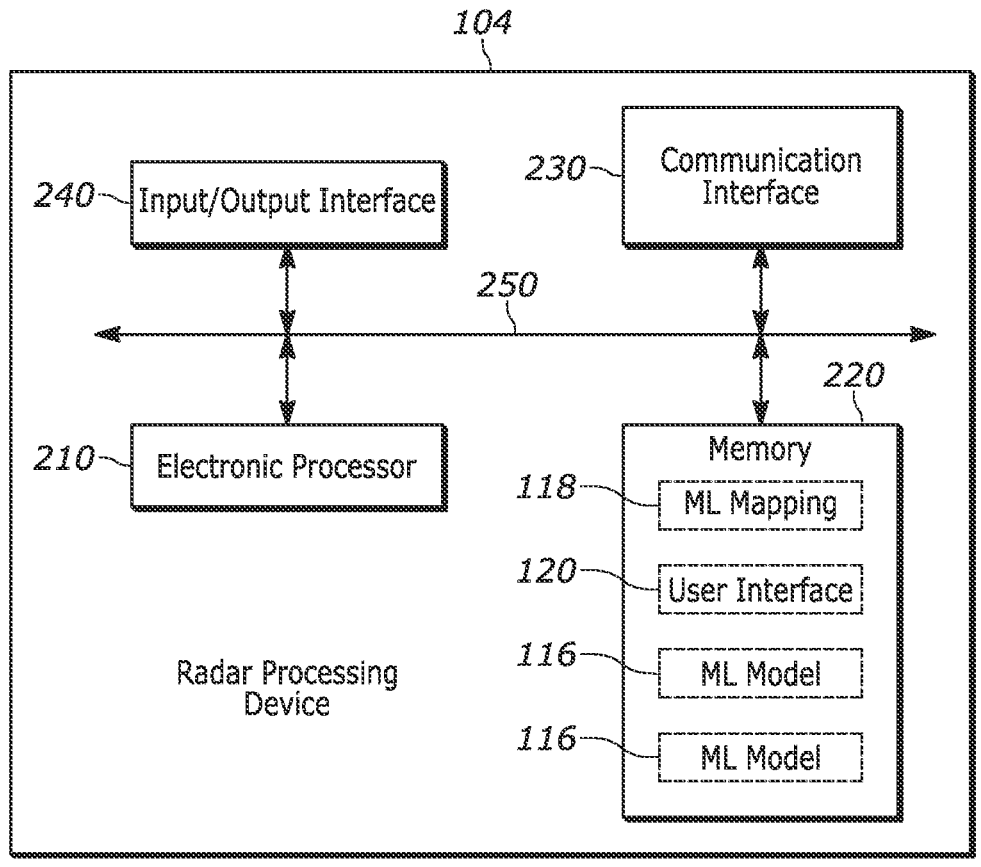
FIG. 2 schematically illustrates a computing device of the system of FIG. 1 in accordance with some examples.

The radar processing device 104, as illustrated in FIG. 1 and described more particularly with respect to FIG. 2, is a computer (e.g., a computer server) or computing device residing in proximity to the radar transceiver 102. In some aspects, the radar processing device 104, (its functions as described herein) is distributed among multiple computing devices. In some aspects, some or all of the radar processing device 104 is implemented by a cloud computing environment. In some instances, components of the radar processing device 104 may be distributed among multiple locations and communicatively coupled to one another via one or more communications networks.

As noted, targets detected by the radar transceiver may actually be clutter, caused by conditions within the ambient environment 110. As described herein, the radar processing device 104 is configured to receive the radar data, process it to remove clutter, and display the actual targets (e.g., on the radar display 112). As illustrated in FIG. 1, the radar processing device 104 implements one or more machine learning models 116 for processing radar data received from the radar transceiver 102. As described herein, the machine learning models may be selected by an operator 114 of the radar system 100 (e.g., via a user interface presented on the radar display 112). The outputs of the machine learning models 116 (e.g., targets with clutter reduced) are processed based on a user sensitivity setting, as described herein, to produce targets for display on the radar display 112.

The radar display 112 is a computing device that includes, among other things, a processor (for example, a microprocessor or another suitable programmable device), a memory (i.e., a computer-readable storage medium), and one or more input devices, output devices, or input and output devices including, for example, one or more displays, keyboards, keypads, mice, joysticks, touchscreens, speakers, microphones, and headsets. In some aspects, the radar display 112 implements a user interface generated and/or configured by the radar processing device 104.

As illustrated in FIG. 1, the database 106 may be a database housed on a suitable database server communicatively coupled to and accessible by the radar processing device 104. In some examples, the database 106 may be part of a cloud-based database system (for example, a data warehouse) external to the system 100 and accessible by components of the system 100 over one or more wired or wireless networks. In other configurations, all, or part of the database 106 may be locally stored in proximity to the radar processing device 104. In some aspects, the database 106 electronically stores operator profile data and machine learning models and associated training data.

Operator profile data refers to profiles stored for individuals who may operate the radar system 100 (e.g., the operator 114). Operator profiles contain information associated with individual operators. Each operator profile includes (or is named, titled, or identified via) a unique identifier for the operator. Operator profiles include operator preferences, which, as described herein, indicate how the operator prefers the radar system 100 to operate to perform clutter mitigation. In particular, operator preferences may include what a particular level of sensitivity means for that operator given an ambient area type, a particular clutter mitigation model, a target type, a sensor type, or other aspects of the system.

FIG. 2 schematically illustrates one example of the radar processing device 104. In the example illustrated, the radar processing device 104 includes an electronic processor 210, a memory 220, a communication interface 230, and an input/output interface 240. The electronic processor 210, the memory 220, the communication interface 230, and the input/output interface 240 communicate over one or more control and/or data buses (for example, a communication bus 250). In some embodiments, the radar processing device 104 is a computer server. FIG. 2 illustrates only one example embodiment of a radar processing device 104. The radar processing device 104 may include fewer or additional components and may perform functions other than those explicitly described herein.

In some embodiments, the electronic processor 210 is implemented as a microprocessor with separate memory, for example, the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), and application specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out functionality of the radar processing device 104 described herein. The memory 220 may include, for example, a program storage area and a data storage area. The program storage area and the data storage area may include combinations of different types of memory, for example, read-only memory and random-access memory. In the embodiment illustrated, the memory 220 stores, among other things, a machine language mapping engine 118, a user interface 120, and one or more machine learning models 116 (also referred to herein as clutter mitigation models), each explained in detail herein.

The communication interface 230 sends and receives communications to and from the radar processing device 104 and other components of the system 100.

The input/output interface 240 may include one or more input mechanisms (for example, a touch screen, a keypad, buttons, knobs, and the like), one or more output mechanisms (for example, a display, a printer, a speaker, and the like), or a combination thereof. The input/output interface 240 receives input from input devices actuated by a user and provides output to output devices with which the user interacts. In some instances, as an alternative or in addition to managing inputs and outputs through the input/output interface 240, the radar processing device 104 may receive user input, provide user output, or both by communicating with an external device, for example, a console computer (for example, the radar display 112), over a wired or wireless connection.

In some examples, the radar processing device 104 uses one or more machine learning methods to analyze radar data and mitigate clutter (as described herein).

Figure 3:
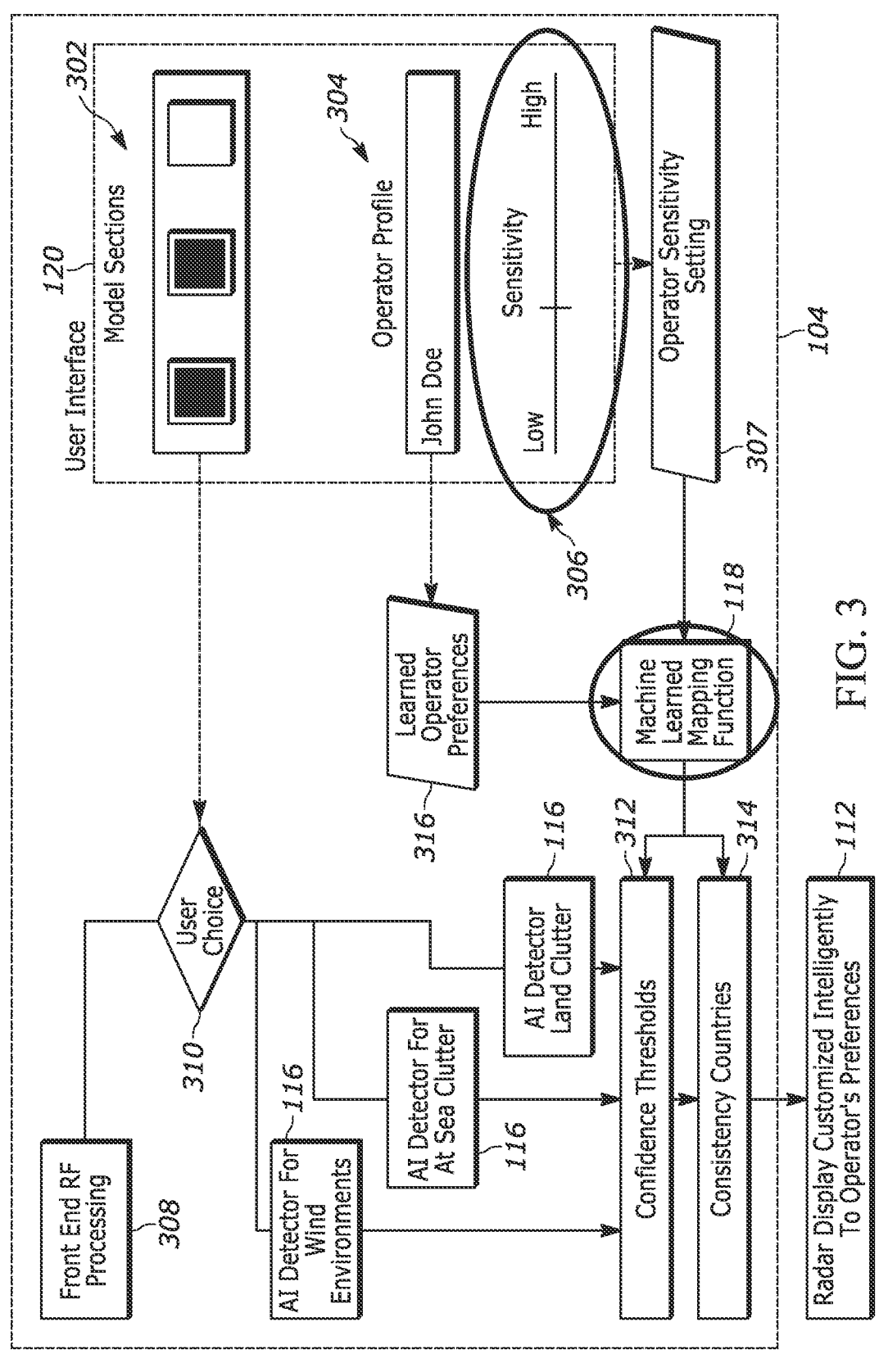
FIG. 3 illustrates aspects of the operation of the system of FIG. 1 in accordance with some examples.

FIG. 3 illustrates aspects of the operation of the system 100. FIG. 3 presents one possible arrangement. Other arrangements are possible.

FIG. 3 includes an example of the user interface 120. In the illustrated example, the user interface 120 is part of a graphical user interface, generated by the radar processing device 104, the radar display 112, or both, and presented on a display (e.g., a touch screen or other suitable display) of the radar display 112. In some instances, the user interface 120 is entirely virtual. In some instances, portions of the user interface 120 may be implemented using physical components (e.g., the use of a knob or slider switch to input a sensitivity level). The user interface 120 includes a model selection mechanism 302, an operator profile component 304, and an operator sensitivity input mechanism 306. The model selection mechanism 302 allows an operator to select one or more machine learning models 116 for use in mitigating clutter. The model selection mechanism 302 may be one or more check boxes, one or more radio buttons, a drop-down list, or another suitable graphical user interface element. The operator profile component 304 indicates the current operator profile. In some instances, the operator profile component 304 allows an operator to select a profile from a drop-down list, a scrolling list, or another suitable graphical user interface element. In some instances, the operator profile component 304 merely displays the current active operator profile based on, for example, an authenticated user of the radar display 112. The operator sensitivity input mechanism 306 allows an operator to input their preferred sensitivity level. The operator sensitivity input mechanism 306 may be, as illustrated, a slider control that moves between low and high settings. In some instances, the operator sensitivity input mechanism 306 may be a virtual knob that rotates between low and high settings. In some instances, the operator sensitivity input mechanism 306 may be a graphical input device that allows an operator to select a number from a range (e.g., between 1 and 100) to represent a desired sensitivity level.

Front end RF processing 308 may occur within the radar processing device 104 or the radar transceiver 102, to produce radar data including one or more detected targets. The radar data is fed to the machine learning models 116, in this example, according to a user choice 310 provided by the operator using the model selection mechanism 302. In the illustrated example, operators may select from a model for use in wind environments, a model to detect clutter at sea, and a model to detect clutter on land. Other models are possible. Each of the selected machine learning models 116 operates as it was trained to select true targets from among the targets detected by the radar transceiver 102. Each of the machine learning models outputs one or more detected targets and a confidence value for each detected target. The confidence value is a numerical value (e.g., a percentage) indicating the model's confidence in its determination that the target is a true target and not clutter.

At blocks 312 and 314, the radar processing device 104 applies post processing to the output of the machine learning models to determine which of the targets will be displayed.

Block 312 applies confidence thresholds. A confidence threshold is target value for a confidence value. When the confidence value for a target exceeds (or, in some instances, meets) the confidence threshold, the radar processing device 104 will display that target on the radar display 112.

As illustrated in FIG. 3, consistency counters are also applied. In some instances, consistency counters may not be used. A consistency counter is used to determine how often a target must exceed the confidence threshold before it is displayed. For example, the radar processing device 104 may require that a target be identified as a true target with a sufficient confidence level by a single machine learning model a particular number of times within a time window before it will display the target (e.g., a target may have to exceed the confidence threshold X times within Y milliseconds in order to be displayed). In another example, the radar processing device 104 may require that a target be identified as a true target with a sufficient confidence level by more than one machine learning model. In another example, the radar processing device 104 may require that a target be identified as a true target with a sufficient confidence level a particular number of times by one or more machine learning models before it is displayed.

In some aspects, the machine learning models must have low confidence for all incorrect decisions and high confidence for all correct decisions. Furthermore, the frequency of models' correct decisions should be monotonically increasing with respect to confidence while the frequency of models' incorrect decisions should be monotonically decreasing for each model, for each class.

When using a trained machine learning algorithm, f (e.g., the machine learning models described herein), to infer the class of new data sample x, many algorithms, including neural networks, random forests, support vector machines, and other supervised and unsupervised classification algorithms, will provide as output a set of numbers, $y=f(x)$, representing the algorithm's predictions for a data sample x. The data sample x is a vector of M features, represented by floating- or fixed-point numbers, $x=[x_1, x_2, \ldots, x_M]$, and the predicted labels y are a vector of N predictions, also represented by fixed- or floating-point numbers, $y=[y_1, y_2, \ldots, y_N]$. Each element, $y_n$, of the prediction vector y represents the machine learning algorithm's estimate of how likely the sample x is of the corresponding class $n \in [1, N]$. A simple example is a single decision tree model, trained to split data into classes, Class 1 and Class 2. At training time, the model splits the data into classes at the end of its branches, where the decision point for each branch is chosen such that as much of the data from Class 1 as possible falls on one side of the decision point and as much of the data from Class 2 as possible falls on the other side of the decision point.

When the trained algorithm infers whether a new sample is a member of Class 1 or Class 2, it assigns any values that land at the end of a branch a probability of belonging to each class proportional to the amount of data samples that landed at that same decision node during training. In a two class example, the probabilities may be denoted $y_1$ and $y_2$ for Class 1 and Class 2 respectively. If 70% of the data points that ended up at the end of that branch during training were of Class 1, then any data point that will end up at the end of that branch during inference will be assigned a probability of $y_1=70\%$, indicating that the model predicts sample x has a 70% likelihood of belonging to Class 1. Other algorithms, such as neural networks and support vector machines, have different mechanisms for computing the predictions y, but these all serve the same basic goal of setting $y_n$ to a high value if the algorithm infers that x has a high likelihood of belonging to class n. In general, a machine learned classification algorithm will output a prediction vector y having one element per candidate class. The predicted class of sample x corresponds to the index of the largest element of y. The value at this index (e.g., 70% in the example above) is casually referred to as a confidence value by those skilled in the art of applied machine learning.

Confidence values are used in subsequent processing after machine learning inference to improve the predictions that are ultimately delivered to the end user. However, the use of confidence values will only improve the results delivered to the end user if those confidence values are validated and demonstrated to be reliable. Algorithms that are prone to being underconfident when correct or overconfident when wrong may lead to worse overall results being delivered to the end user. Identifying whether confidence values are reliable and can be used to improve the results of machine learning decisions delivered to an end user therefore requires additional validation checks to be performed after the machine learning model is trained. Predictions must be demonstrated via these validation checks to have a high probability of holding a high value corresponding to the predicted class when the algorithm is correct and proven to have a low probability of holding a high value corresponding to the predicted class when the algorithm is incorrect. For example, if a classification algorithm is shown to have a high probability of predicting that a sample x, which is truly a member of Class 2, is a member of Class 1 with high probability, i.e., $y_1=0.9$ and $y_2=0.1$, then the values y cannot be correctly called confidence values and therefore cannot be correctly used as such in subsequent processing.

To address this common problem, a new validation step is added, in some instances, after the machine learning training process. The validation step confirms that predictions y from an algorithm x can correctly be employed as confidence values in subsequent processing, as described above. The goal of this validation step is to identify machine learning algorithms prone to making confidently wrong decisions and to disallow those algorithms from being used in subsequent inference processing. Ideally, only machine learning algorithms which have a high probability of being confidently correct and a low probability of being confidently wrong would be allowed to be deployed in the inference system. More formally, algorithms are not used in the inference system unless they demonstrate a high probability of having a high value for $y_n$ when class n is correctly predicted and a low probability for having a high value for $y_n$ when class n is incorrectly predicted.

Figure 5:
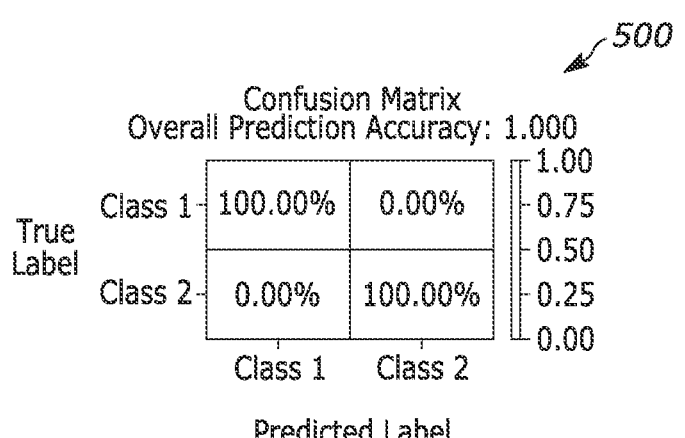
FIG. 5 illustrates a confusion matrix in accordance with some examples.
Figure 6:
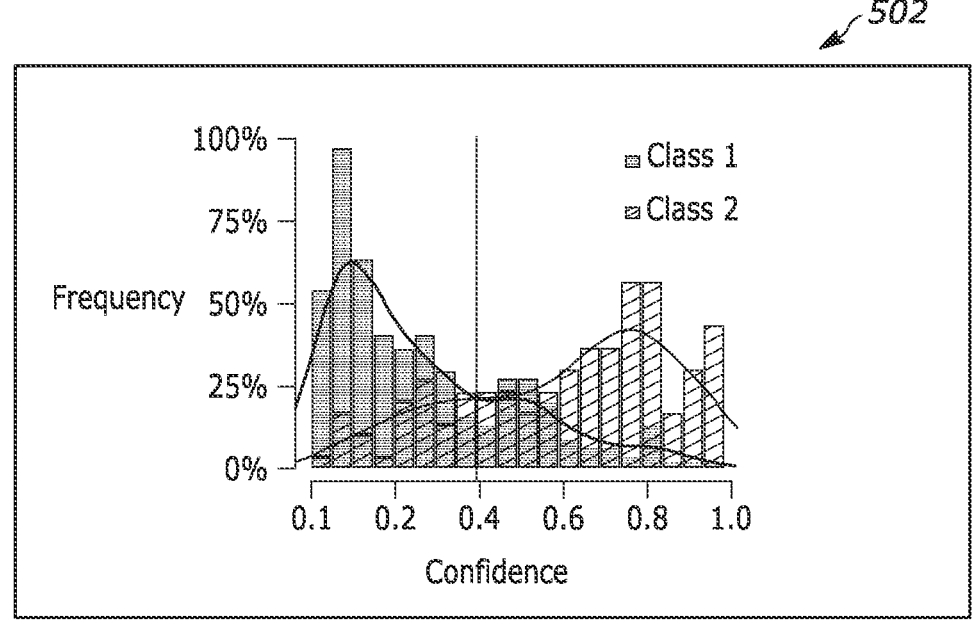
FIG. 6 illustrates a confidence histogram in accordance with some examples.

In some instances, validation that outputs y meet this property and thus can correctly be used to improve the results delivered to the end user may be achieved through the following steps. After the machine learning algorithm is trained, it is used to infer the predictions Y for a set of v validation samples X. Validation samples are samples which have a known true class but were not used in setting the parameters of f (e.g., weights of a neural network or split points of a decision tree) during training. Since the true class of each prediction y is known, all predictions y are then split into $N^2$ groups, which N is the number of classes, such that each subset $Y_{AP} \subset Y$ contains all predictions that were truly of class A and predicted to be of class P. This is the subset of predictions normally counted towards the corresponding square of a confusion matrix, such that the number of elements in $Y_{AP}$ is equal to the number of samples in the element of the confusion matrix which corresponds to true class A and predicted class P. (FIG. 5 illustrates an example ideal confusion matrix 500.) For each set of v values $Y_{AP}$, those v values are then displayed as a histogram, where the horizontal axis of the histogram is confidence in the predicted class, $y_P$, and the vertical axis is the frequency of each confidence bin. FIG. 6 illustrates an example confidence histogram 502 that is plotted per confusion matrix square, per model in order to determine whether the model is confidently wrong.

Once the resulting $N^2$ groups of histograms are generated (one per each square of the confusion matrix) they can be used to validate that the predictions of the algorithm f can be correctly used as confidence values. For each histogram corresponding to a diagonal (correct) confusion matrix square the $y_P$ values depicted in that histogram correspond to confidence in decisions that were correct. As per the criteria above, it is desirable that confidently correct decisions occur with high frequency. It is further desirable that highly confidently correct decisions occur at higher frequency than mildly confident correct decisions. Formally, this is validated by confirming that the histogram of $y_P$ values for each $Y_{AP}|A=P$ is monotonically increasing from left to right. Monotonically increasing histograms corresponding to diagonal elements of the confusion matrix indicate high probability of highly confidently correct decisions and low probability of unconfident correct decisions, as is required.

Similarly, for each histogram corresponding to an off-diagonal element of the confusion matrix, the $y_P$ values depicted in that histogram correspond to confidence in decisions that were incorrect. As per the criteria described above, it is desirable that confidently incorrect decisions occur with low frequency. If an incorrect decision is made, it is required to be of low confidence so that it can be eliminated by downstream processing which prevents low confidence decisions from reaching the end user. It is further desirable that low confidence incorrect decisions occur with higher frequency than high confidence incorrect decisions so that as many incorrect decisions as possible may be eliminated before reaching the end user by processing which removes low confidence decisions. Formally, this is validated by confirming that the histogram of $y_P$ values for each $Y_{AP}|A \neq P$ is monotonically decreasing from left to right. Monotonically decreasing histograms corresponding to off-diagonal elements of the confusion matrix indicate low probability of highly confident but wrong decisions relative to the probability of low confidence wrong decisions.

For each histogram, monotonicity is formally quantified by counting the percentage of the total histogram bins which are non-monotonic. For example, if a histogram is off-diagonal and supposed to be monotonically decreasing, then each given bins should be smaller than all of the bins to its left. If any bin is higher than one of the bins to its left, it is counted in the percentage of non-monotonic bins. Each histogram must have a sufficiently low percentage of non-monotonic bins and be monotonically increasing or decreasing in the correct direction to be considered validated. A classifier is considered ready for deployment if and only if all histograms are sufficiently monotonic and increasing or decreasing in the correct direction.

Once an algorithm f is validated to output predictions y which can be reliably interpreted as confidence values, those values can be exploited at inference time to improve the overall accuracy of the decisions reported to the end user and to allow the end user to customize the outputs displayed, which is an objective of the disclosed examples. This may be achieved by using the confidence values in a threshold test, defined as follows. At inference time when an algorithm predicts a certain class with a certain confidence, that confidence is checked against a threshold. If the confidence threshold is met, then a counter which keeps track of how many of the last M decisions made were of each class is incremented. In the case of one classifier, the counter will track some number, N, of consecutive decisions from the classifier. If the requirement says that at least 75% of the last N classifier decisions must be of a certain class in order to take further action, the consistency counter will verify that out of the last N classifier decisions, 75% of those decisions met the confidence threshold of a specific class. Once it notifies the system this requirement was met, the system can choose to no longer call the classifier for a decision and can instead report the target as confirmed for operators to take action, thus saving computing resources.

Consistency counters can work with one classifier or an ensemble of classifiers. In cases where multiple classifiers are being used in a machine learning ensemble, a separate counter is maintained for each classifier voting on the decisions to be made. In this case, the requirement may change to say that three out of four classifiers need to have their decisions meet the confidence threshold at least 75% of the time in the last N decisions. When enough votes over time are cast for a given class from enough classifiers in the ensemble, that class is then reported to the end user. This ensures that decisions are only reported to the end user if they are confident, persistent over time, and confirmed by multiple decision makers. Again, once this criterion is met, the system can choose to no longer call the classifiers and to mark the target as confirmed for operators.

Figure 7:
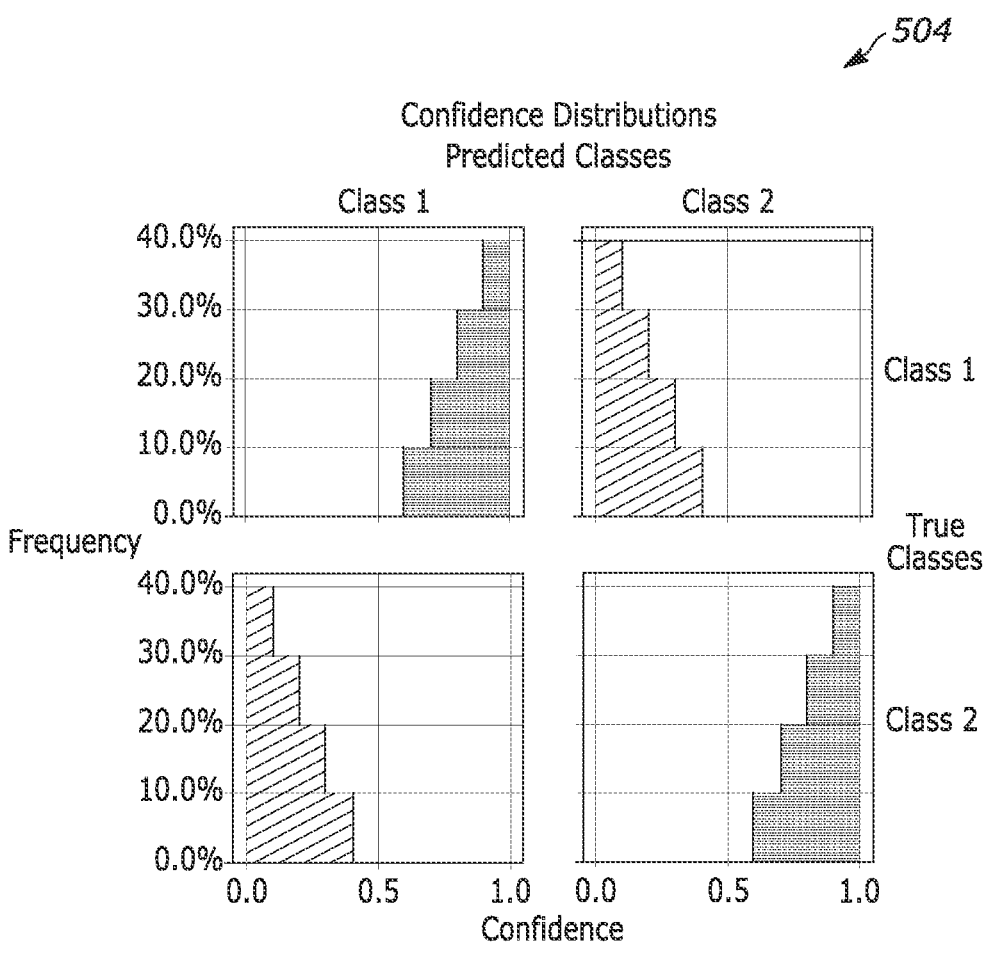
FIG. 7 illustrates a confidence distribution in accordance with some examples.

The confidence threshold can also be a variable that has a different setting per each classifier in the case of an ensemble. Some ensemble members may tend to be confidently wrong more than others. In those cases, increasing the confidence threshold of that classifier helps to decrease false alarms. This ensures that classifiers that are more prone to being confidently wrong do not outvote classifiers which are mildly confident but correct. For example, if a classifier with 99% accuracy is added to a machine learning ensemble with three other classifiers having joint ensemble accuracy of 95%, the new classifier can counterintuitively decrease the overall ensemble accuracy if on the rare occasions it is wrong it is confidently wrong. This problem is exacerbated if those cases are more common in test data than in training data. Requiring each classifier to meet a different confidence threshold for its decision to count towards incrementing subsequent counters ensures that differences in classifier confidence distribution do not lead to a decrease in overall ensemble accuracy. (FIG. 7 illustrates an example ideal confidence distribution 504.) In some embodiments, N of M counters can be replaced with weighted averages, filters, classical fusion algorithms such as Dempster-Shafer, and downstream machine learning algorithms.

Consistency counters and confidence thresholds ensure that the decision from the machine learning model is not reported to the end user from a single reading of the classifier. This is important for systems which need to track a target over time and ultimately facilitate making a decision to take action on the target. Even highly accurate classifiers can have periods of time where they flip between decisions intermittently due to noise. Therefore, in order to utilize each classifier to the best of its abilities and mitigate any wrong actions taken by the system, consistency counters are adjusted by the sensitivity settings set by the user.

Returning to FIG. 3, some operators may desire a more exaggerated response (i.e., change in sensitivity increases with distance from the default center setting) while others desire a more conservative response (i.e., change in sensitivity decreases with distance from the default center setting). For example, a conservative setting may be employed in a scenario where platform motion may cause the operator to make an erroneous change to the sensitivity setting. Furthermore, the mapping between the sensitivity setting and the consistency counters and confidence thresholds required to achieve the operator's desired sensitivity is nonlinear.

Accordingly, the values of the confidence thresholds and the consistency counters are set using the machine learning mapping function 118, based on the operator sensitivity setting and the operator preferences 316, as shown in FIG. 3. The machine learning mapping function 118 is a machine learning algorithm trained to set confidence thresholds and consistency counters. The input to the machine learning mapping function 118 is a user sensitivity setting and the output is one or more confidence thresholds and consistency counters, as described herein. In some instances, training of the machine learning mapping function 118 occurs during a training mode, where the user interface 120 presents the operator with an input mechanism (e.g., a feedback button) that allows the user to select which of the displayed targets that the operator believes to be clutter or false positives. The operator may also be able to provide feedback indicating that the system responded too dramatically (e.g., it was too aggressive in removing clutter and may have removed true targets). In some instances, the operator can select targets, which the operator did not want to see, did want to see, or both, at the current sensitivity level. Using this feedback, the machine learning mapping function 118 will learn the counters and confidence thresholds required to achieve a radar display picture that is as close as possible to the operator's indicated desire. In some instances, the operator can adjust the sensitivity setting, provide additional feedback, and repeat the process such that a map from sensitivity setting to necessary confidence thresholds, counter thresholds, and other parameters both inside and outside the machine learning models, are learned for all machine learning models active at that time. In this way, the radar processing device 104 learns what a particular sensitivity level means to a particular operator under particular circumstances (e.g., operating a certain machine learning model or models, operating in particular environment, tracking particular targets, and the like).

As noted, in some cases, radar or other sensor systems are unable to differentiate between environmental clutter and true targets (e.g., when mission requirements demand tracking targets, which are low and slow flying, small, or otherwise possess kinematic, visual, or other characteristics which blend in with the ambient environment). To mitigate these problems, the radar processing device 104 performs intelligent radar clutter mitigation based on operator preferences and sensitivity settings. In one example, the radar processing device 104 includes in the memory 220 a machine learning mapping function, which, is used to perform an example method 400 for operating a sensor system to sense targets within an ambient environment using dynamic control of intelligent radar clutter mitigation (illustrated in FIG. 4). Although the method 400 is described in conjunction with the example radar system 100 as described herein, the method 400 may be used with other types of sensor systems and devices. In addition, the method 400 may be modified or performed differently than the specific example provided.

As an example, the method 400 is described as being performed by the radar processing device 104 and, in particular, the electronic processor 210. In some examples, the electronic processor 210 includes multiple electronic processors included in the radar processing device 104 that perform all or a portion of the method 400. Further, in some aspects, the radar processing device 104 is a distributed controller in which processors of multiple devices cooperate to form the radar processing device 104 and perform its functionality. In some aspects, portions of the method 400 may be performed by other devices, including for example, the radar display 112.

At block 402, the electronic processor 210 receives sensor data including a plurality of targets. For example, the electronic processor 210 receives radar data from the radar transceiver 102, identifying the targets 108 (FIG. 1).

At block 404, the electronic processor 210 selects a clutter mitigation model (e.g., a machine learning model 116). In one example, the electronic processor 210 selects a clutter mitigation model based on the ambient environment. For example, the electronic processor 210 may select a clutter mitigation model for use at sea when inputs from a geolocation system indicates that the radar transceiver 102 is scanning an ocean area. In another example, the electronic processor 210 may select a clutter mitigation model for use during high winds based on weather data received for the ambient environment. In some instances, the electronic processor 210 selects the clutter mitigation model (or multiple clutter mitigation models) based on a model selection input received from a human machine interface (e.g., the radar display 112 or a portion of the input/output interface 240).

At block 406, the electronic processor 210 generates, with the clutter mitigation model, a subset of the plurality of targets based on the sensor data. For example, the electronic processor 210 feeds the radar data into one or more of the machine learning models (selected at block 404) and receives as output a subset of targets identified by the one or more machine learning models as true targets. The output also includes confidence values for each of the identified targets.

At block 408, the electronic processor 210 receives, from the human machine interface, an operator sensitivity setting. The operator sensitivity setting is set by an operator of the system 100 (as described above with respect to FIG. 3). The operator sensitivity setting may be a numeric value (e.g., an integer between 1 and 100, a percentage, and the like) representing a degree of sensitivity, between a low and a high sensitivity. For example, 0% may represent the lowest possible sensitivity, while 100% may represent the highest possible sensitivity. In another example, a value or 1 may represent the lowest possible sensitivity, while a value of 10 may represent the highest possible sensitivity.

At block 410, the electronic processor 210 generates, with a machine learning mapping function, one or more post-processing parameters based on the operator sensitivity setting. Post processing parameters include confidence thresholds and consistency counter values. As described above, the machine learning mapping function is trained to output confidence thresholds and consistency counter values for a particular sensitivity value, based on which model or models are operating.

In some instances, in addition one or more operator preferences is used in addition to the sensitivity setting to generate the post processing parameter. For example, the electronic processor 210 may retrieve (e.g., from the database 106), an operator profile for the current operator of the sensor system. The electronic processor 210 is able to determine, from the operator profile, one or more operator preferences. The one or more operator preferences, as described herein, may have been used by the machine learning mapping function to set confidence thresholds and consistency counters for the selected sensitivity level that vary from confidence thresholds and consistency counters for the selected sensitivity level in other situations. For example, the same sensitivity level may mean a more or less aggressive sensitivity when operating over land than when operating at sea.

At block 412, the electronic processor 210 processes the subset of the plurality of targets based on one or more post-processing parameters to select from the subset of the plurality of targets, one or more display targets. For example, as described above, with respect to FIG. 3, confidence thresholds and/or consistency counters are applied to select display targets.

At block 414, the electronic processor 210 displays, via the human machine interface, the one or more display targets. For example, the electronic processor 210 causes the radar display 212 to present the display targets on a screen of the radar display 212.

Figure 8:
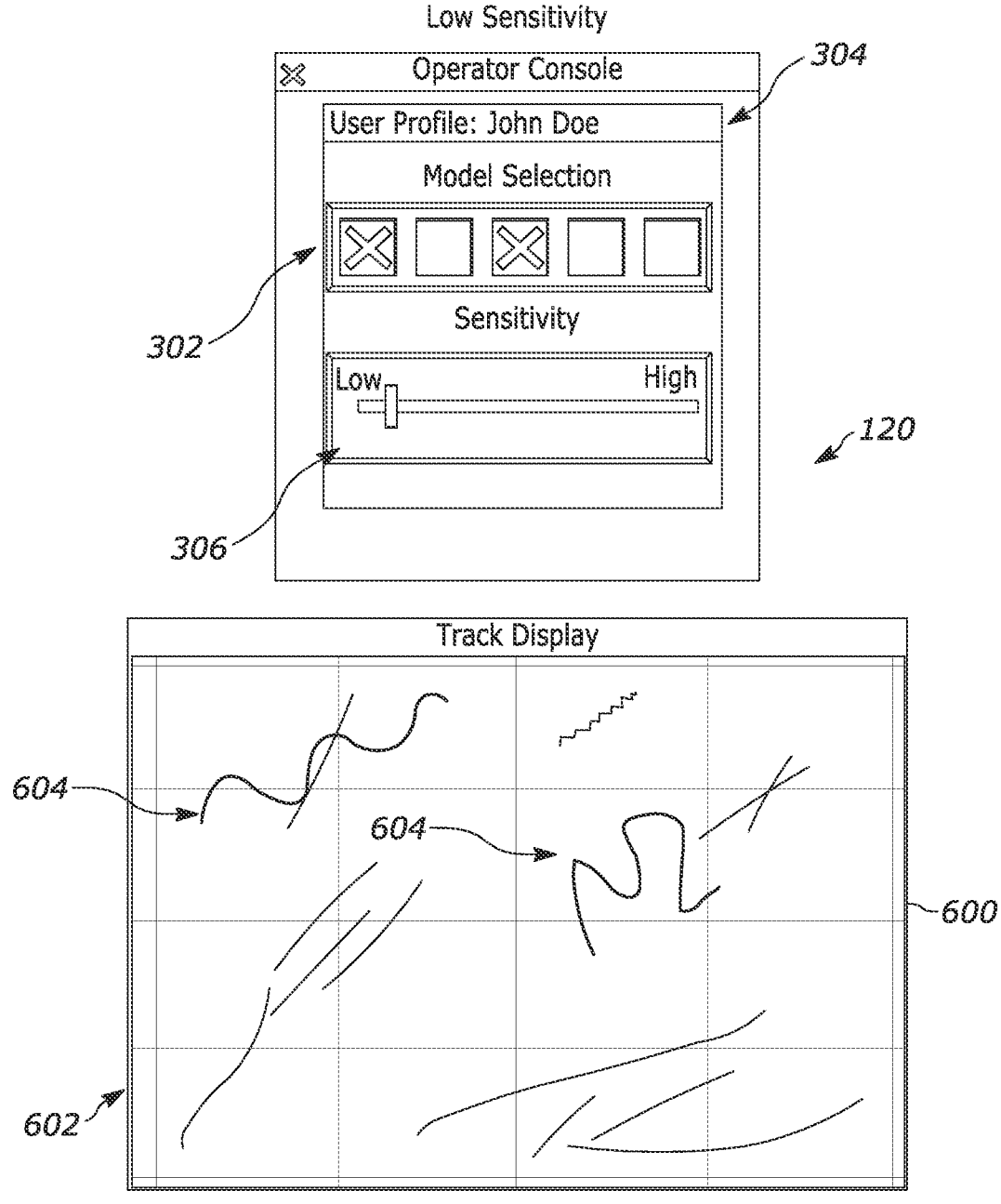
FIG. 8 illustrates an example user interface for the system of FIG. 1 in accordance with some examples.
Figure 9:
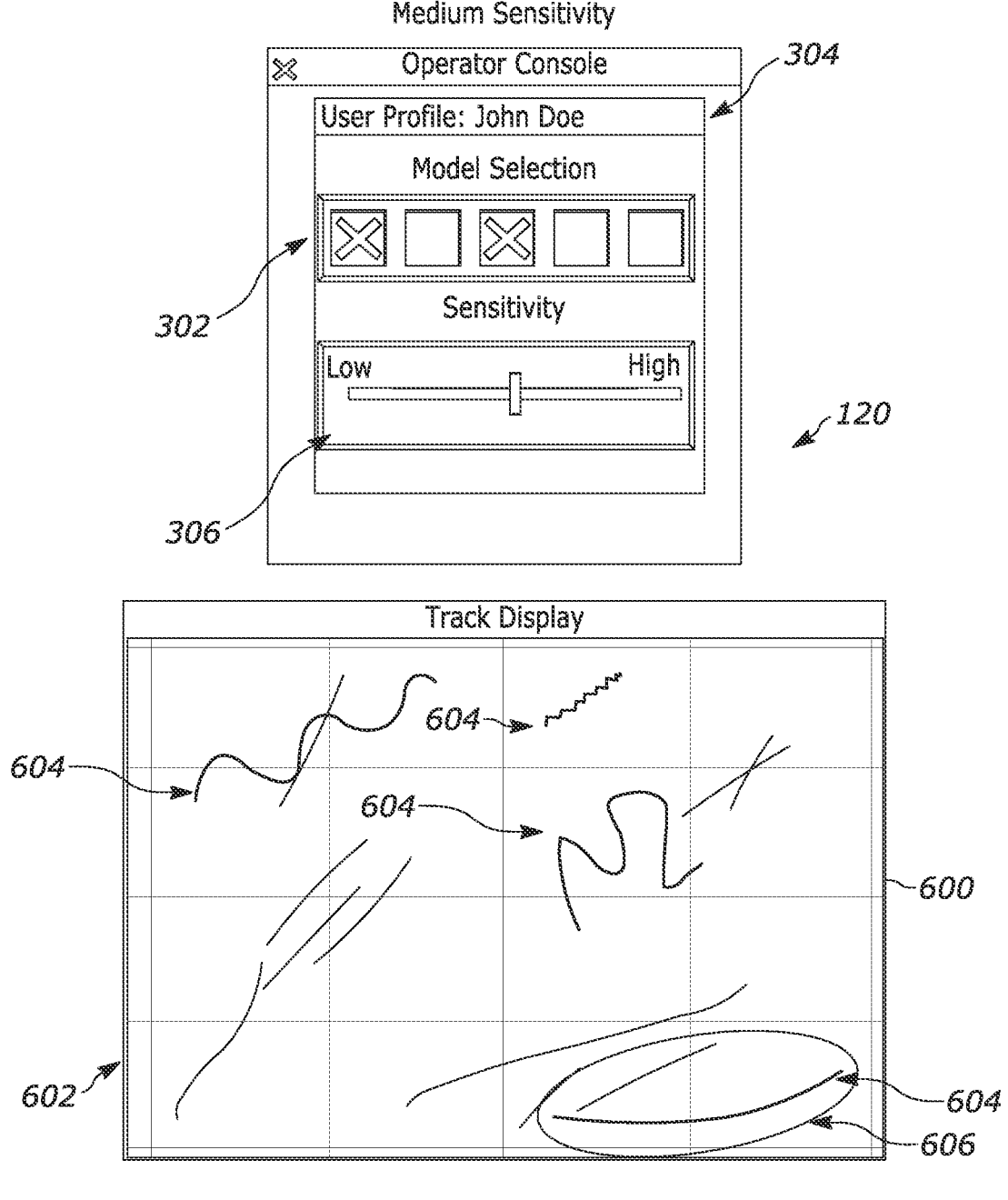
FIG. 9 illustrates an example user interface for the system of FIG. 1 in accordance with some examples.
Figure 10:
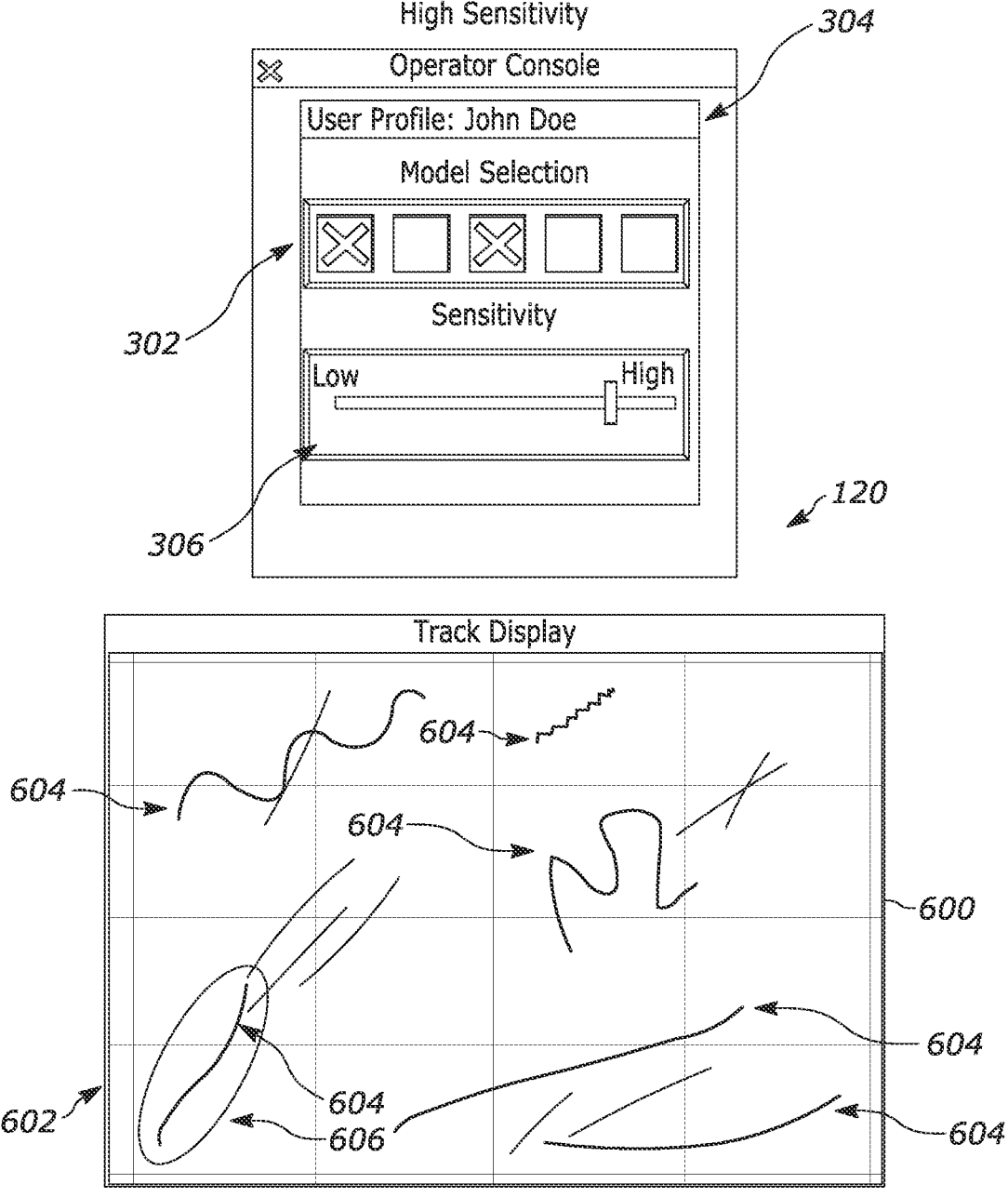
FIG. 10 illustrates an example user interface for the system of FIG. 1 in accordance with some examples.

FIGS. 8-10 illustrate example user interfaces for the system 100 (e.g., as displayed on the radar display 212). As illustrated in FIG. 8, the user interface 120 includes the model selection mechanism 302, the operator profile component 304, and the operator sensitivity input mechanism 306. Additionally, a track display 600 is illustrated. In some aspects, the radar display 212 presents targets on the track display 600. In the illustrated examples, a plurality of tracks 602 are displayed, which may represent clutter or true targets. The highlighted tracks 604 are display targets, whose detections passed the confidence thresholds and consistency counters checkpoints, as described herein, and where predicted to be true targets. The non-highlighted tracks did not pass these checks yet and have not yet been determined to be true targets (i.e., they may be the result of clutter.

As described herein, and shown in FIGS. 8-10, as the operator sensitivity setting (e.g., as set by operator sensitivity input mechanism 306) the goes from low to high, the track picture changes. In general terms, a low sensitivity setting (as illustrated in FIG. 8) means the system is less sensitive to false alarms but may miss some true targets. An operator may choose this setting in a congested environment. As sensitivity increases, (as illustrated in FIGS. 9 and 10), the system is more sensitive to detecting false targets but will identify more true targets. An operator may choose these settings in a calmer environment. As illustrated in FIGS. 9 and 10, an operator may select tracks (e.g., tracks 606) while in a training mode to provide feedback regarding the selected tracks.

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate array's (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various features and advantages of certain examples described above are set forth in the following claims.

We claim:

1. A sensor system configured to sense targets within an ambient environment, the system comprising:
  a human machine interface; and
  an electronic processor coupled to the human machine interface and configured to:
  receive sensor data including a plurality of targets;
  select a clutter mitigation model;
  generate, with the clutter mitigation model, a subset of the plurality of targets based on the sensor data;
  receive, from the human machine interface, an operator sensitivity setting;
  generate, with a machine learning mapping function, a post-processing parameter based on the operator sensitivity setting;
  process the subset of the plurality of targets based on the post-processing parameter to select, from the subset of the plurality of targets, a display target; and
  display, via the human machine interface, the display target;
  wherein the post-processing parameter is a consistency counter threshold; and
  processing the subset of the plurality of targets includes selecting, from the subset of the plurality of targets, the display target when the number of times that a confidence value for the display target exceeds a confidence threshold exceeds the consistency counter threshold.

2. The system of claim 1, wherein the electronic processor is further configured to:

select the clutter mitigation model and a second clutter mitigation model based on a model selection input received from the human machine interface;
generate, with the second clutter mitigation model, a second subset of the plurality of targets based on the sensor data;
process the second subset of the plurality of targets based on the post-processing parameter to select, from the subset of the plurality of targets, a second display target; and
display, via the human machine interface, the second display target.

3. The system of claim 1, wherein the electronic processor is further configured to:
retrieve, from a database, an operator profile for a current operator of the sensor system;
determine, based on the operator profile, an operator preference; and
generate the post-processing parameter based on the operator preference and the operator sensitivity setting.

4. The system of claim 3, wherein the operator preference is one selected from a group consisting of an operator preference for an ambient area type, an operator preference for the clutter mitigation model, an operator preference for a target type, and an operator preference for a sensor type for the sensor system.

5. The system of claim 1, wherein:
the post-processing parameter is a confidence threshold; and
the electronic processor is further configured to process the subset of the plurality of targets by selecting, from the subset of the plurality of targets, a display target when a confidence value for the display target exceeds the confidence threshold.

6. The system of claim 1, wherein the electronic processor is further configured to:
receive, via the human machine interface, operator feedback for the display target; and
train the machine learning mapping function using the operator feedback and the operator sensitivity setting.

7. The system of claim 1, wherein the electronic processor is further configured to select the clutter mitigation model based on the ambient environment.

8. The system of claim 1, wherein the clutter mitigation model is a machine learning model configured to identify clutter within the sensor data to identify which of the plurality of targets are true targets.

9. The system of claim 1, wherein the sensor system is a radar system.

10. A method for operating a sensor system configured to sense targets within an ambient environment, the method comprising:
receiving sensor data including a plurality of targets;
selecting a clutter mitigation model;
generating, with the clutter mitigation model, a subset of the plurality of targets based on the sensor data;
receiving an operator sensitivity setting;
generating, with a machine learning mapping function, a post-processing parameter based on the operator sensitivity setting;
processing the subset of the plurality of targets based on the post-processing parameter to select, from the subset of the plurality of targets, a display target; and
displaying the display target;
wherein the post-processing parameter is a consistency counter threshold; and wherein processing the subset of the plurality of targets includes selecting, from the subset of the plurality of targets, a display target when the number of times that a confidence value for the display target exceeds the confidence threshold exceeds the consistency counter threshold.

11. The method of claim 10, further comprising:

selecting the clutter mitigation model and a second clutter mitigation model based on a model selection input received from an operator of the system;

generating, with the second clutter mitigation model, a second subset of the plurality of targets based on the sensor data;

processing the second subset of the plurality of targets based on the post-processing parameter to select, from the subset of the plurality of targets, a second display target; and displaying the second display target.

12. The method of claim 10, further comprising:

retrieving, from a database, an operator profile for a current operator of the sensor system;

determining, based on the operator profile, an operator preference; and generating the post-processing parameter based on the operator preference and the operator sensitivity setting.

13. The method of claim 12, wherein determining the operator preference includes determining one selected from a group consisting of an operator preference for an ambient area type, an operator preference for the clutter mitigation model, an operator preference for a target type, and an operator preference for a sensor type for the sensor system.

14. The method of claim 10, wherein:

the post-processing parameter is a confidence threshold; and processing the subset of the plurality of targets includes selecting, from the subset of the plurality of targets, a display target when a confidence value for the display target exceeds the confidence threshold.

15. The method of claim 10, further comprising:

receiving operator feedback for the display target; and training the machine learning mapping function using the operator feedback and the operator sensitivity setting.

16. The method of claim 10, wherein selecting the clutter mitigation model includes selecting the clutter mitigation model based on the ambient environment.

17. The method of claim 10, wherein the clutter mitigation model is a machine learning model configured to identify clutter within the sensor data to identify which of the plurality of targets are true targets.

18. The method of claim 10, wherein the sensor system is a radar system.

* * * * *